US006808308B2

United States Patent
Thompson

(10) Patent No.: US 6,808,308 B2
(45) Date of Patent: Oct. 26, 2004

(54) REMOVABLE SHIELDING FOR USE DURING NEUROLOGICAL EXAMINATIONS ON A WHOLE BODY PET SCANNER

(75) Inventor: Christopher J. Thompson, Montreal (CA)

(73) Assignee: Scanwell Systems, Montreal (CA)

( * ) Notice: Subject to any disclaimer, the term of this patent is extended or adjusted under 35 U.S.C. 154(b) by 0 days.

(21) Appl. No.: 10/155,150

(22) Filed: May 23, 2002

(65) Prior Publication Data

US 2003/0058997 A1 Mar. 27, 2003

Related U.S. Application Data

(60) Provisional application No. 60/293,745, filed on May 25, 2001.

(51) Int. Cl.[7] .............................................. H01J 35/16
(52) U.S. Cl. ..................................... 378/203; 250/515.1
(58) Field of Search ...................... 378/203; 250/515.1

(56) References Cited

U.S. PATENT DOCUMENTS 4,123,657 A * 10/1978 Krippner et al. .......... 250/385.1
4,400,820 A * 8/1983 O'Dell et al. ................ 378/209

* cited by examiner

*Primary Examiner*—John R. Lee
*Assistant Examiner*—Phillip A Johnston
(74) *Attorney, Agent, or Firm*—Ansel M. Schwartz

(57) ABSTRACT

A shielding system for a scanner. The system comprises a headrest. The system comprises shielding attached to the headrest. The system comprises a scanner couch to which the headrest is attached. The headrest moves with the scanner couch into the scanner. A method for scanning a patient. The method comprises the steps of connecting a headrest with a shield to a couch. There is the step of moving the couch with the headrest into an opening of the scanner so the shielding blocks the opening. A headrest for a couch of a scanner.

20 Claims, 7 Drawing Sheets

REMOVABLE SHIELDING FOR USE DURING NEUROLOGICAL EXAMINATIONS ON A WHOLE BODY PET SCANNER

This application claims the benefit of U.S. Provisional Application No. 60/293,745 filed May 25, 2001.

FIELD OF THE INVENTION

The present invention is related to removable shielding for use during neurological examinations on a whole body positron emission tomography scanner. More specifically, the present invention relates to removable neck shielding for use during neurological examinations on a whole body positron emission tomography scanner.

BACKGROUND OF THE INVENTION

Positron emission tomography (PET) has evolved as a valuable technique for mapping the human brain and in providing the most specific imaging modality for the detection and staging of cancer. Many PET centres do a mix of these two types of imaging, but the optimal requirements for these modalities is very different. Brain mapping is performed using $O^{15}$ water as a tracer, with many studies of about 1 minute scanning time on the same subject under differing conditions of brain activation. Whole body scans for cancer detection use the $F^{18}$-fluoro-deoxyglucose as a tracer. Its 110 minute half-life allows for longer scans, typically 1 to 2 hours per patient. The high count-rates encountered during water studies imply they are severely contaminated by noise due to random and scattered counts. This noise can be reduced by improving the shielding of the detectors from activity in the rest of the body. In the Computer Technology and Imaging (CTI) HR+ scanner at the Montreal Neurological Institute (MNI) a permanent shield had been installed. This device, even though provided by the manufacturer, is not approved for use in the USA, and to minimize the risk of harm to the patients in scanners where it is installed, limit switches, and mechanical "stops" are added to couch to prevent the axial drive motor extending the couch into the gantry. These safety devices prevent the scanner being used for oncology studies, if these involve imaging other organs besides the brain.

Positron emission tomography (PET) is a technique in the field of Nuclear Medicine which allows for "Functional Imaging" where the intensity of the signal from different body parts is proportional to the rate at which it is working. It is used for mapping regions of the brain which are involved in performing certain tasks, in measuring which parts of the heart are lacking in blood supply or have enough blood but are not able to function correctly, and in distinguishing fast growing tumours from normal healthy tissue. The first application is mostly of interest to those studying the brain and the inter-relationship between its many parts. The second is currently the best way of deciding whether a patient would benefit from cardiac bypass surgery or grafting, or would require a heart transplant. The third, (and this is a very fast growing application at present) allows a fairly rapid and presently the most accurate assessment of the possibility of distant metastases which often occur in cancer). Almost as many PET scanners were purchased in 1999 as there were in the period up until then. This is mostly due to the fact that it is possible to get reimbursement of PET scans from most health insurance providers. Although it is the most expensive way to diagnose cancer, it is the most accurate, and the cost is justified on the basis of the cost of not treating the disease appropriately as soon as its presence has been recognized.

Early PET scanner had one ring of detectors and these were shielded with thick cylindrical sheets of lead which very effectively prevented gamma rays from outside the body section being imaged from reaching the detectors. In the 80's and early 90's scanners with several rings of detectors were developed and these had thin lead cylindrical sheets between each ring of detectors. In order to record a useful "event" (and these events, millions of them, are used to form the image) one must observe the near-simultaneous detection of two gamma rays which are produced by the annihilation of a positron and an electron which occurs very close to and soon after a positron emitting isotope decays. The gamma rays are emitted at 180 degrees apart, but the line along which they travel in opposite directions is randomly orientated. Since these gamma rays do not emerge in the planes formed by the rings of detectors and the lead septa, most of the events are not detected in this geometry. Recently most PET scanners have sets of septa which can be retracted, or none at all. These are much more efficient (about 10 times more), but are about 50 times more efficient in the detection of scattered radiation which is both within and outside the field of view. Improved reconstruction and scattered radiation algorithms have been developed to deal with this increase in image signal and greater increase in unwanted information.

There has been quite a lot of work to reduce the effect of the unwanted radiation from outside the field of view. In some scanners, it is possible to purchase what the manufacturer calls the "Neurological Insert". The advantage is that it performs much higher quality brain studies by reducing the out-of-field radiation very effectively. This is because the diameter through which the head goes is much smaller than the diameter of the hole required for the body to pass through. However, this and the one described in the paper by Hasegawa require turning off the scanner's power, removal of the front cover of the scanner half an hour's work, replacement of the front cover and temperature stabilization of the scanner. This is considered a service function, which some PET centers perform themselves, while others have a serviceman do the work. It is thus not a practical solution which would provide superior image quality when doing brain studies mixed in with whole body studies.

The present invention provides similar shielding properties than the "permanent" Neurological Insert, and can be removed if required. However, it is NOT necessary to remove it to do cardiac scans, or for most oncology studies. It would only need to be removed for examining patients with "head and neck" cancer where a whole body scan is also needed.

SUMMARY OF THE INVENTION

The present invention pertains to a shielding system for a scanner. The system comprises a headrest. The system comprises shielding attached to the headrest. The system comprises a scanner couch to which the headrest is attached. The headrest moves with the scanner couch into the scanner.

The present invention pertains to a method for scanning a patient. The method comprises the steps of connecting a headrest with shielding to a couch. There is the step of moving the couch with the headrest into an opening of the scanner so the shielding blocks the opening.

The present invention pertains to a headrest for a couch of a scanner. The headrest comprises a head support. The headrest comprises a support from which the head support extends. The headrest comprises shielding connected to the support. The headrest comprises a backing extending from the support.

It is well known that the shielding against out-of-field scattered radiation is not very effective on whole body PET scanners operated with their slice-defining septa retracted. Additional shielding can be employed during neurological studies since the diameter of the head is much less than the field of view required for imaging the human torso. A new lead-plate shielding system which mounts on the scanner's removable head-rest has been designed, built and tested (on the CTI HR+ PET scanner). This device is called the "NeuroShield". The outer diameter of the 9 mm thick lead plate is 550 mm which has a "U" shaped hole 220 mm in diameter. It is positioned just above the subject's shoulders. A molded plastic coupling piece, produced by stereolithography, was designed to accommodate the complex shape of the headrest under the subject's neck, and provide a flat surface for mounting the lead plate. Our testing on human subjects involved comparing the prompt and random count rates and dead time during bolus-water activation studies. Scans on different subjects, (matched for age and sex) with no additional shielding, with the CTI Neurological Insert, and with the NeuroShield were compared. The random counts were reduced by a factor of 1.56 when using the permanent CTI Neurological Insert, and 1.44 using the NeuroShield. The NeuroShield is easily removed to allow whole body scanning. It can remain in place as the couch extends through the scanning tunnel in the gantry. Its main application will be at PET centers doing a mixture of whole body and neurological studies, where the CTI Neurological Insert cannot be installed permanently.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
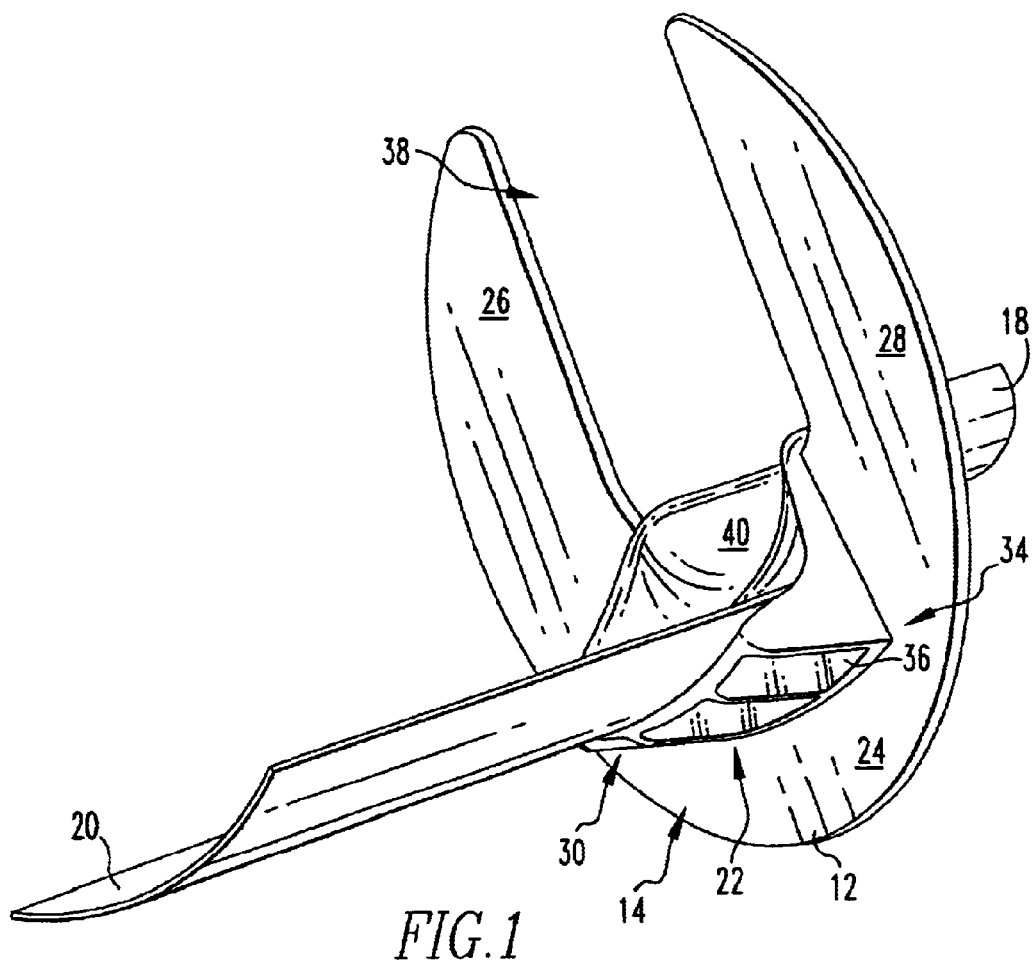
FIG. 1 shows a NeuroShield, headrest and plastic coupling piece as rendered by "Solid Edge" 3D design program.

Referring now to the drawings wherein like reference numerals refer to similar or identical parts throughout the several views, and more specifically to FIG. 1 thereof, there is shown a shield system 10 for a scanner. The system 10 comprises a headrest 12. The system 10 comprises shielding 14 attached to the headrest 12. The system 10 comprises a scanner couch 16 to which the headrest 12 is attached. The headrest 12 moves with the scanner couch 16 into the scanner.

Preferably, the headrest 12 includes a head support 18. The headrest 12 preferably includes a backing 20 adapted to connect to the couch 16. Preferably, the headrest 12 includes a support 22 disposed between and connected to the head support 18 and backing 20, with the shielding 14 contacting the support 22.

The shielding 14 preferably has a base 24 that contacts the support 22, a first prong 26 that extends from the base 24 at a first side 30 of the support 22 and a second prong 28 that extends from the base 24 at a second side 34 of the support 22. Preferably, the shielding 14 is disposed in perpendicular relationship with the backing 20 and the head support 18. The head support 18 and the backing 20 are preferably in spaced relationship and in alignment with each other but offset from each other. Preferably, the support 22 has ribbing 36 that extends to the backing 20.

The first prong 26 and second prong 28 and backing 20 preferably form a U-shape that is adapted to close a scanner opening except for a gap 38 disposed between the first prong 26 and the second prong 28 through which the head of a patient can extend and rest on the head support 18 in the scanner. Preferably, the support 22 has a top surface 40 which is contoured for the neck of the patient to rest against. Preferably, the support 22 is contoured to fit with the couch 16. The support 22 preferably has loop and hook fasteners 42 to connect to the couch 16. Preferably, the shield includes a layer of lead 44.

The present invention pertains to a method for scanning a patient. The method comprises the steps of connecting a headrest 12 with a shield to a couch 16. There is the step of moving the couch 16 with the headrest 12 into an opening of the scanner so the shielding 14 blocks the opening.

Preferably, the moving step includes the step of moving a head support 18 of the headrest 12 into the scanner. The connecting step preferably includes the step of connecting a backing 20 of the headrest 12 to the couch 16. Preferably, the connecting step includes the steps of placing a gap 38 of the shielding 14 through the head support 18 and attaching a base 24 of the shielding 14 to a support 22 of the headrest 12 that connects to and is disposed between the head support 18 and the backing 20.

The present invention pertains to a headrest 12 for a couch 16 of a scanner. The headrest 12 comprises a head support 18. The headrest 12 comprises a support 22 from which the head support 18 extends. The headrest 12 comprises shielding 14 connected to the support 22. The headrest 12 comprises a backing 20 extending from the support 22.

Preferably, the head support 18 and the backing 20 are in spaced relationship and in alignment with each other but offset from each other. The first prong 26 and second prong 28 and backing 20 preferably form a U-shape that is adapted to close a scanner opening except for a gap 38 disposed between the first prong 26 and the second prong 28 through which the head of a patient can extend and rest on the head support 18 in the scanner.

In the operation of the invention, a new shielding 14 system 10 called "NeuroShield" has been built. The principal novelty of the approach is that lead 44 in the Neuro-Shield is attached to the headrest 12, not the gantry, and so moves with the couch 16. The advantage is that the diameter of the hole through which the subject's head must pass can be much smaller than when the lead 44 is fixed.

The headrest on all recent CTI PET scanners including the EXACT HR+ is made from rigid plastic and part of its strength comes from its complex curvature. In order to attach the lead 44 to the headrest, a thermoplastic piece was designed to fit closely to contour of the headrest in the region between the couch 16 top and the head support 18. This piece needed a plane vertical surface to which a cut lead plate is attached and four ribs between these two surfaces to provide structural support.

In order to design the coupling piece, the complete headrest 12 was digitized on a numerically controlled milling machine to which a sensing probe was attached. The surface under the neck region was then used as one surface of a part, which was designed using the program "Solid Edge" (Unigraphics Solutions, Maryland Heights, Mo.).

Figure 2:
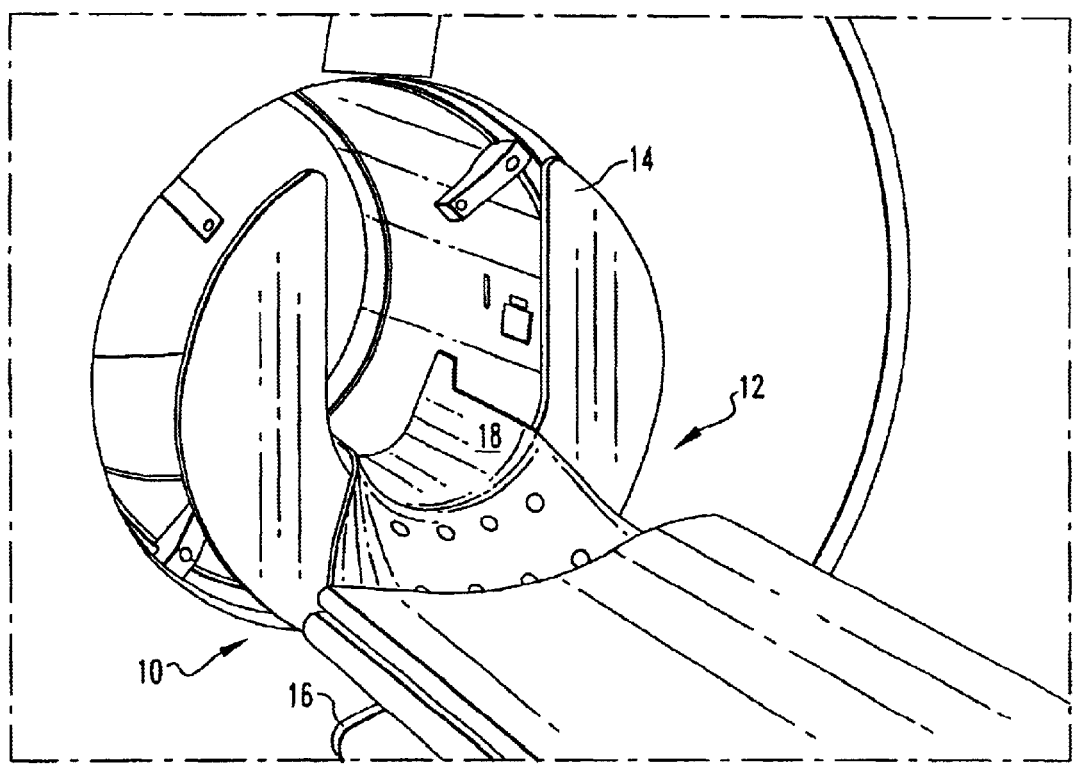
FIG. 2 shows a NeuroShield before painting (U shaped lead plate attached to headrest) in CTI scanner.
Figure 3:
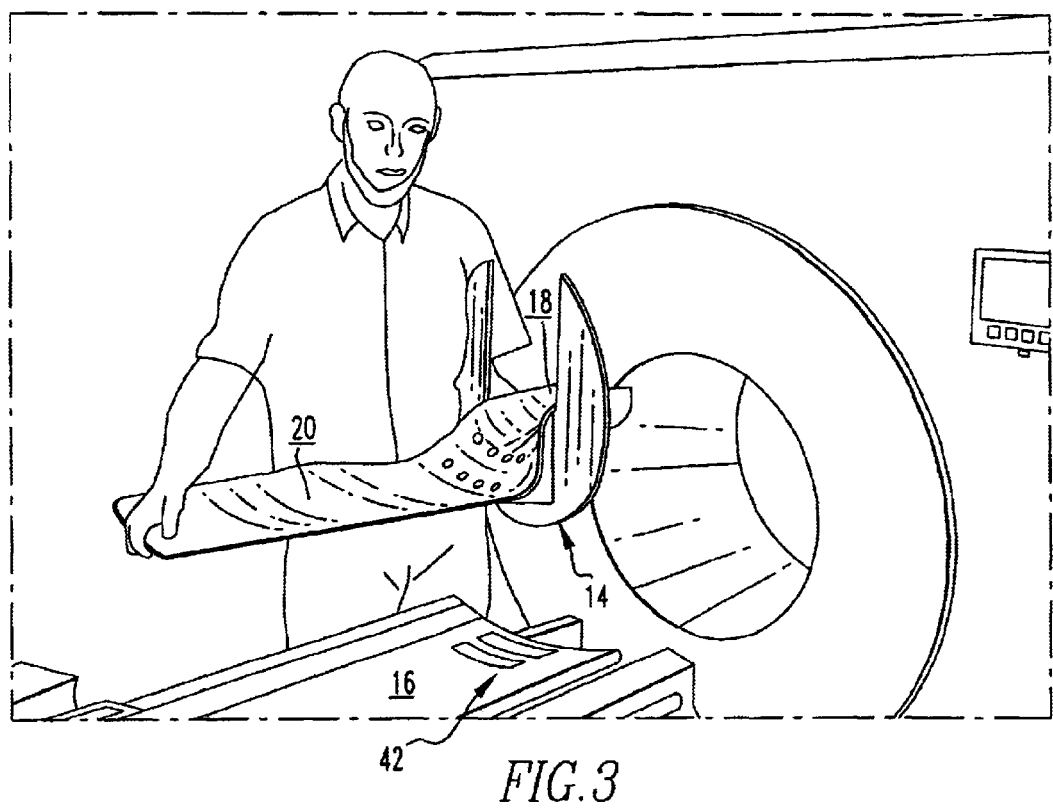
FIG. 3 shows an illustration of how NeuroShield is positioned on scanner's couch.
Figure 4:
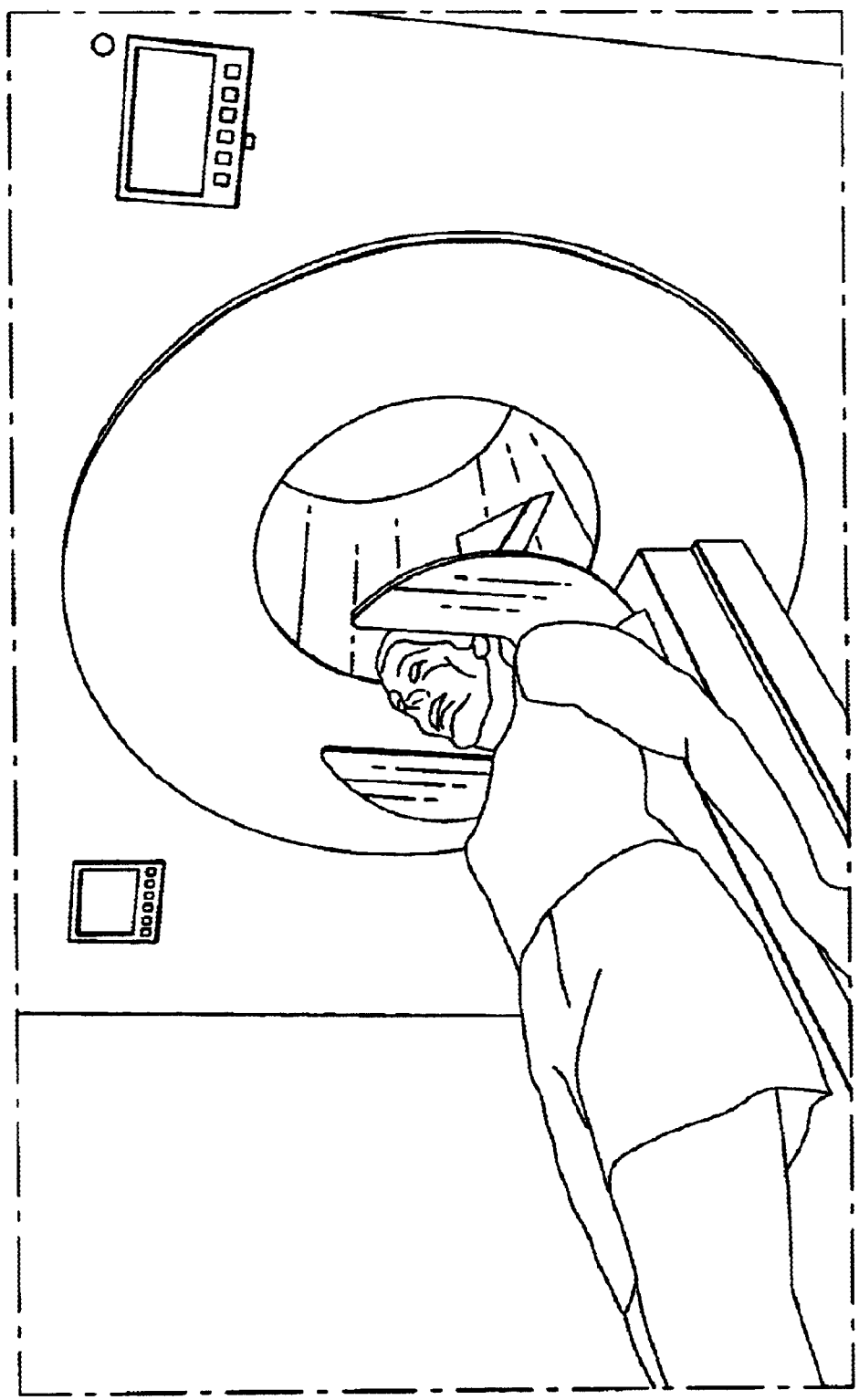
FIG. 4 shows a subject positioned on the couch with her head on the headrest, and her neck through the hole in the NeuroShield before the couch is moved into the gantry.

A solid object was made by stereo-lithography. This process entails shining a modulated ultraviolet light beam on the surface of a resin bath the bottom of which is slowly lowered. The light cures the resin creating a solid object which is suitable for casting. From this, a casting mold was made and the plastic resin coupling part was produced-colour matched to the scanner. The shielding 14 itself is made from a 9 mm thick lead: antimony (95:5) alloy which is much harder than pure lead. The lead plate was also designed with "Solid Edge" and cut to shape using a water jet. The plastic coupling piece requires no further finishing, but the lead 44 must be cleaned, sanded and painted to match the scanner. The fully assembled design is shown in FIG. 1, and the NeuroShield installed in the scanner is shown in FIG. 2.

The headrest 12 is attached to the scanner couch 16 with Velcro® strips on its underside which conforms to the couch 16 contour. The lead 44 piece is only 10 cm from the end of the couch 16, so even though the centre of gravity is well beyond the end of the couch 16 the Velcro prevents it falling off. The NeuroShield is removed by peeling the Velcro starting at the end farthest from the head and lifting it off.

TABLE 1

Comparison of Physical Properties of CTI Neurological Insert and NeuroShield

|  | CTI NeuroInsert | NeuroShield |
| --- | --- | --- |
| Outer Diameter | 600 mm | 550 mm |
| Inner Diameter | 400 mm | 220 mm |
| Thickness | 9 mm | 9 mm |
| Mass | 22.5 kg | 20.2 kg |
| Area | 197 cm$^2$ | 176 cm$^2$ |
| Attachment | Gantry | Headrest |
| Removable | No | Yes |
| Whole body scans? | No | Yes |

Phantom studies were performed to measure the shielding 14 effectiveness. For these studies a 20 cm diameter, 20 cm long flood calibration phantom containing 1.7 KBq of $^{68}$Ge was placed centrally in the scanner on the headrest 12. A 1100 MBq $^{137}$Cs source was mounted on a long rod and attached to a translation stage with a 30 cm travel. The source was advanced stepwise in 15 mm (v=5 mm/sec) increments with a delay of 30 seconds at each step until it touched the surface of the stationary source. The experiment was performed with no shielding 14, and later with either the CTI Neurological insert or the NeuroShield in place. The upper level discriminator was set at 850 keV to demonstrate the effect on the random count rate. An 600-second scan was performed for each shielding 14 condition.

During each scan, the count-rates for prompts, randoms and dead time were recorded in the "rates-file" which can be produced on request during scans. The stop and go motion of the source driven by the translation stage produced a stair-case time-count-rate curve which was compared for each condition.

During typical water bolus activation studies, 12 separate injections of 370 MBq are used for separate scans and activation conditions. Rather than perform a new set of PET studies on the same subject with different shielding 14 conditions, data from similar subjects was analyzed. Subjects whose data was used for this study were selected by different investigators in various protocols. These protocols were all approved by the MNI Research Ethics Committee and all subjects are required to give informed consent and provide a brief medical history. From these histories approximately age and sex matched subjects were chosen. The group of subjects who were scanned without additional shielding 14 was used as a reference group. Subjects in this group, (M:3, F:5 age 27 y o) were all healthy non-smokers. Data from 6 clinical studies and 7 non-smoking volunteers (M:6, F7 age 33.8 y o) performed before the NeuroShield was installed, and a similar group (M:4, F6 age 46.8 y o) after the NeuroShield was installed in July 2000.

A "rates-file" is produced during bolus water studies which provides continuous information on the total (true+scattered+random) prompt counts, the delayed counts, dead time, frame number, etc, every second.

Figure 6:
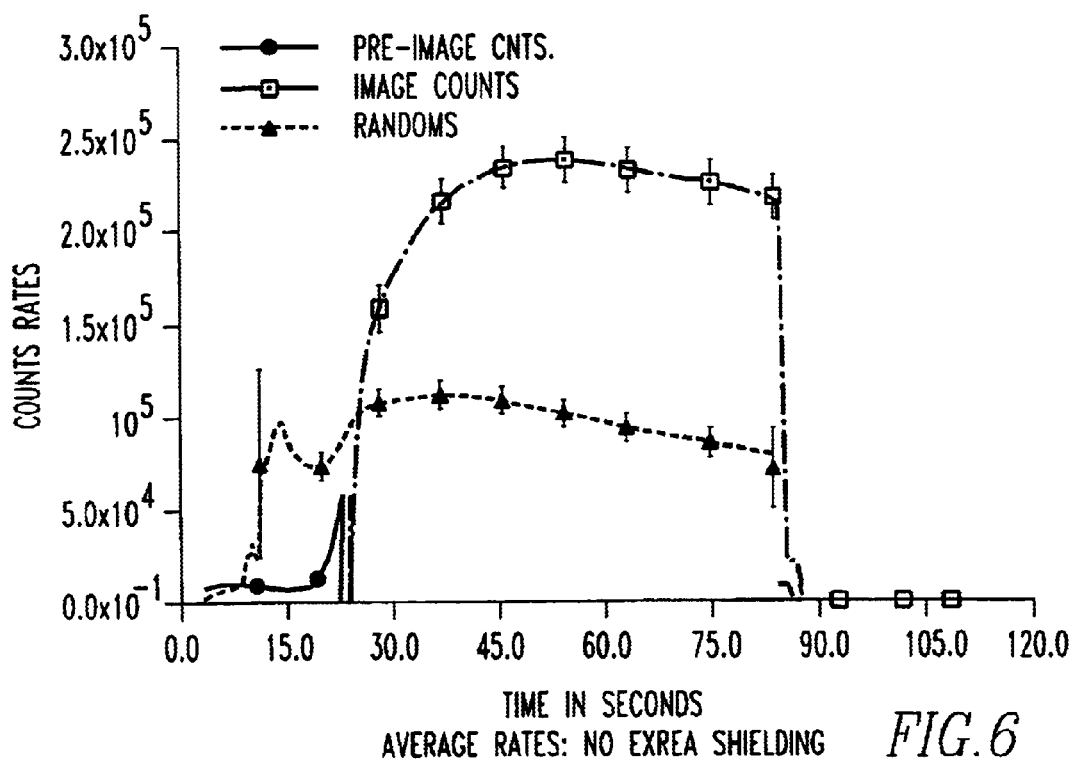
FIG. 6 shows count rates (prompts-randoms dotted, randoms dashed) before and during the scan with no extra shielding.
Figure 7:
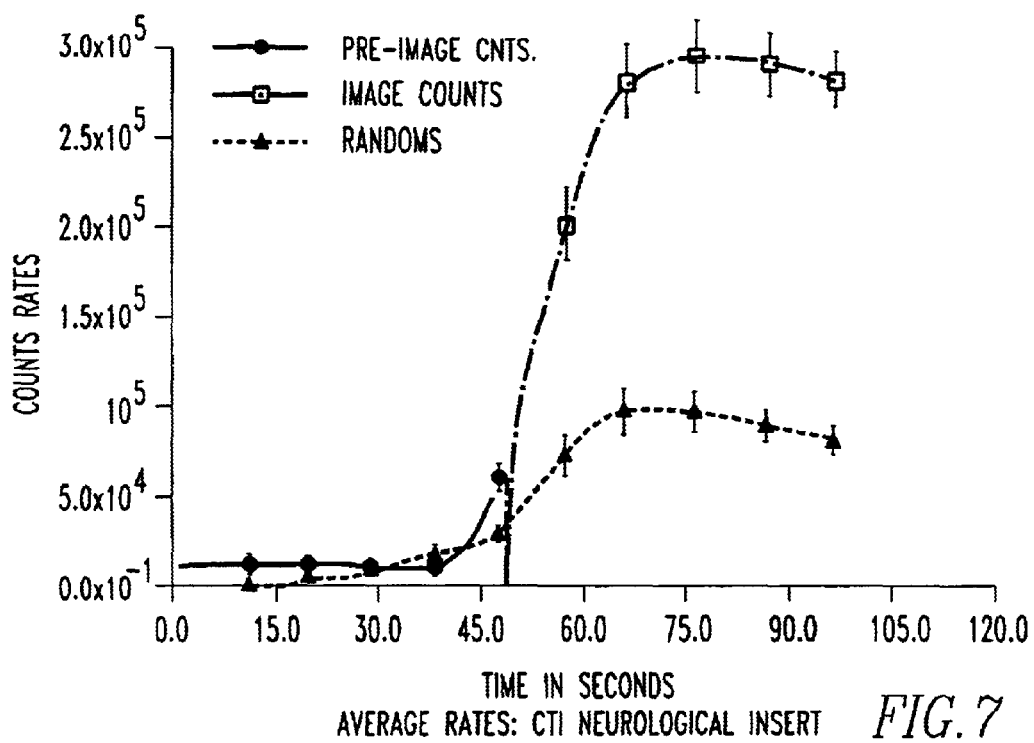
FIG. 7 shows count rates (prompts-randoms dotted, randoms dashed) before and during the scan using CTI neurological insert.
Figure 8:
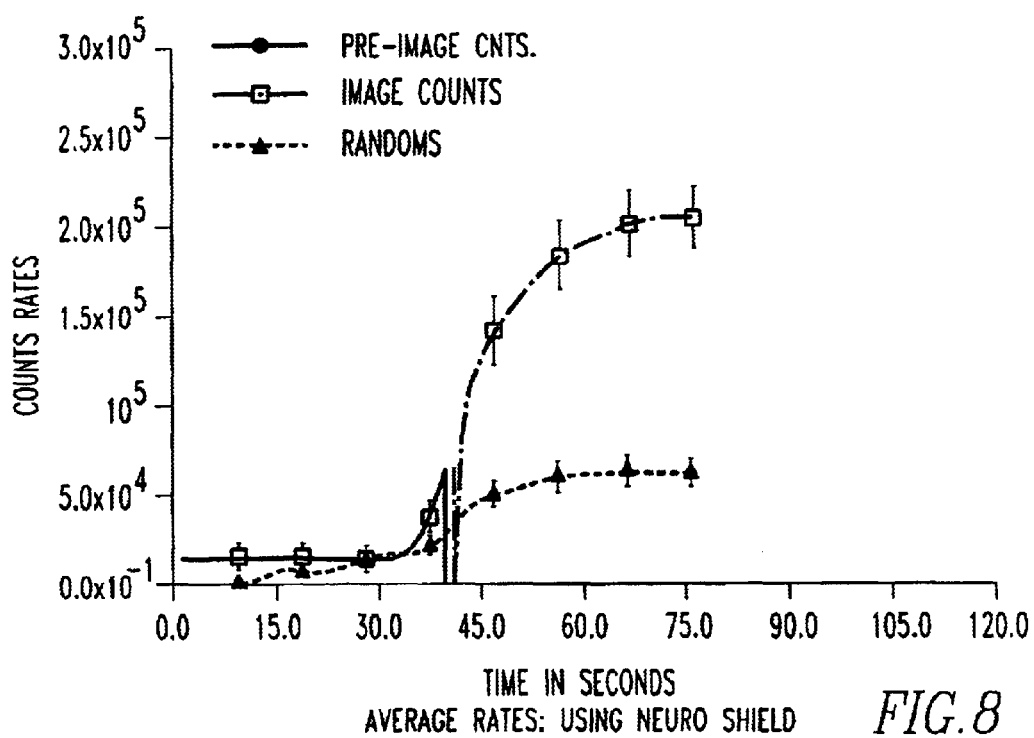
FIG. 8 shows count rates (prompts-randoms dotted, randoms dashed) before and during the scan using the Neuroshield.

These rates files were processed to identify the point of greatest positive slope in the prompt count-rate by detecting the maximum difference between two contiguous sets of five consecutive points. The 12 curves were then averaged after time-skewing each scan for each subject. The time-aligned average scan rates file is saved for each subject. The standard deviation was calculated for all points and displayed for every eighth point to ensure that the scans were consistent and hence typical of that scanning condition. In some cases one scan file was removed from the set, if the data was very different from the other scans indicating a poor injection or other error in the scan protocol. The error bars in FIGS. 6–8 show the standard deviation of the count-rates at every eighth point after the time skew correction, to demonstrate that the count-rates during the scanning time are quite consistent for each subject. The shape of these curves varies considerably from subject to subject due to variability in lung and cardiac function.

The physical factors: size, weight, area of the CTI neurological insert and the NeuroShield are compared in Table I. Since the headrest 12 attaches the couch 16 with Velcro®, it is not "part of the scanner" and can easily be removed. This also ensures that once set in place, it is quite firmly attached.

Figure 5:
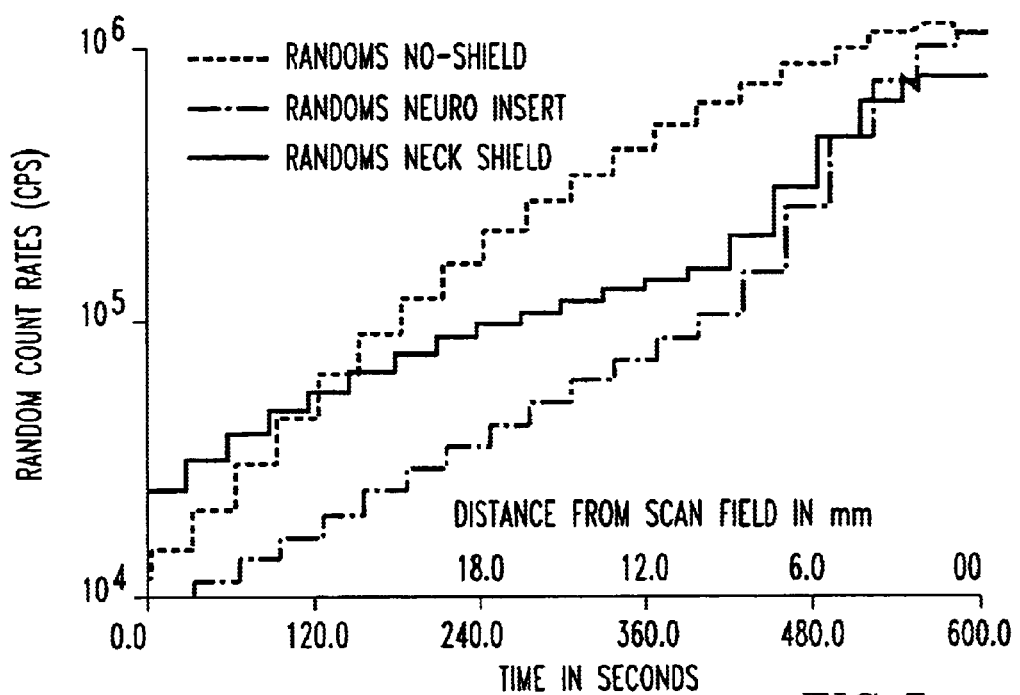
FIG. 5 shows random count rates from Cs-137 source which was moved from 30 cm beyond FOV in steps of 15 mm every 30 seconds towards scan field. During bolus water activation studies, random count-rates are in the range corresponding to the source's position between 4 and 5 minutes where the neck shield is very effective.

The results of the phantom studies are shown in FIG. 5. The random count rates show clearly evident changes as the shielding 14 is improved. Clearly both types of the additional shielding 14 is most effective when the source is still some distance from the scan field. Since the aperture is smaller, the NeuroShield is superior to the CTI neurological insert until the source was closer to the scan field than the lead 44 shielding 14 (this occurs at a time of about 500 seconds in the graph).

Typical rates files (averaged over 10–12 injections in normal volunteers) are shown in FIGS. 6 (no additional shielding), 7 (with CTI neurological insert) and 8 (with the NeuroShield). The results are summarized in Table II. The column designated "Prompt-randoms (kcps)" is the rate of true+scattered counts after subtracting the random count-rate. There is a significant reduction in the random count rate with either the CTI neurological insert or NeuroShield installed. The dead time is also lower by about 1.5% with both methods of shielding. The average prompt count rates are reduced as the shielding 14 improves but the differences are less than one standard deviation. The scattered radiation from the body will be reduced by the shielding 14 so one would expect the prompt count-rate to be less.

TABLE 2

Comparison of (prompt-random) and random count rates for three shielding configurations

| | # of subjects | # of scans | Prompt-randoms (kcps) | Randoms % | Dead time % |
|---|---|---|---|---|---|
| No Shielding | 8 | 96 | 217 ± 58 | 48.9 ± 5.5% | 15.5 ± 1.5% |
| CTI Insert | 12 | 147 | 210 ± 54 | 31.2 ± 4.2% | 14.1 ± 2.2% |
| NeuroShield | 7 | 92 | 196 ± 42 | 33.9 ± 4.0% | 14.0 ± 1.8% |

Phantom studies show that NeuroShield is most effective in shielding when activity is in the range of 20–30 cm from scan field. As the source approaches the scan field, the detectors, especially those near the back for the scan field, have a direct line-of-sight view of the source so shielding is less effective. However, the NeuroShield is very useful in shielding from activity in the lungs and heart where the out-of-field activity is most concentrated.

The NeuroShield is easy to install and well accepted by patients, staff and researchers. The 22 cm wide vertical cutout does not pose any problems when the subjects are viewing a large screen video monitor, nor in their access to the touch sensitive surface sometimes used to provide feedback during scanning. It has also been found very useful for the improved access to patient's head. Some researchers have attached a bite-bar to the NeuroShield to help maintain subject position. This has been found easier than clamping it to the headrest 12 and it is more rigid.

There was concern about subject safety when the idea was originally proposed. However the quick-release used to unlock the couch 16 drive is just as effective as before. With the CTI insert, there is a slight chance that the subject's head could collide with the shielding 14 if their head is not restrained while the patient is being scanned. This is much less likely with the NeuroShield since the lead 44 plate moves with the subject.

The headrest 12 used in this scanner is the same one used in all recent CTI scanners, so the NeuroShield should work on any of these. The same concept could be adapted to other whole body PET scanners like the GE Advance®. It would probably be even more effective on systems with dual headed gamma cameras operating in coincidence since these have no fixed shielding 14 on the detectors.

The shielding 14 is provided by a sheet of high density, high atomic weight material (actually lead: antimony alloy 95:5%) which is disposed a predominantly vertical plane through which the head protrudes into the scanning field.

Figure 9:
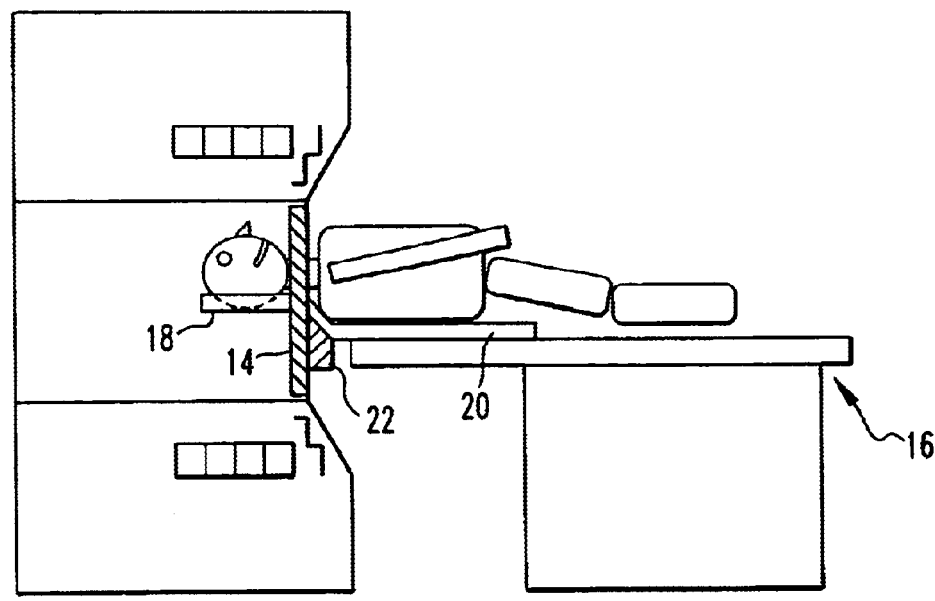
FIG. 9 shows a PET scanner with patient being scanned using NeuroShield.
Figure 10:
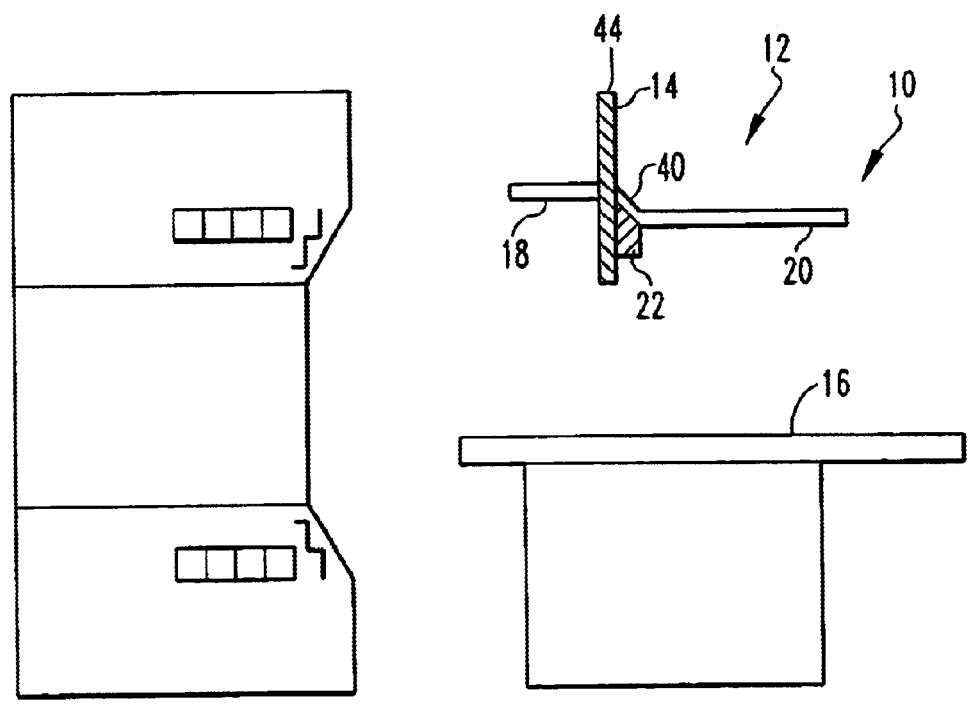
FIG. 10 shows a PET scanner showing NeuroShield removed from couch.

The shielding 14 is attached to the headrest 12, and the headrest 12 is removable, as shown in FIGS. 9 and 10. Thus the shielding 14 is removable. The shielding 14 moves with the patient since it is attached to the headrest 12 which is attached to the scanning couch 16. The place where the shielding 14 is attached to the headrest 12 is in front of the scanning field, thus it does not interfere with the scanner's field of view when doing brain studies. The inner diameter of the hole through which the head extends is smaller than would be acceptable if the patient's head were "pushed through it" as it would appear to the patient if he were lying on the couch 16. The colour of the lead 44 matches the scanner so looks to the subject to be "part of the scanner".

The NeuroShield has been shown to have similar shielding 14 properties to the "permanent shielding" provided by CTI. It has the great advantage of being easily removable making it suitable for use in sites which do a mixture of PET scans during brain studies. It has been very well accepted by subjects, researchers and technical staff.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A shielding system for a scanner for a patient who is having the patient's head scanned comprising:
   a headrest;
   shielding attached to the headrest to shield the scanner from radiation emitted from the patient's body beyond the head; and
   a scanner couch to which the headrest is removably attached, the headrest moves with the scanner couch into the scanner.

2. A system as described in claim 1 wherein the headrest includes a head support.

3. A system as described in claim 2 wherein the headrest includes a backing adapted to connect to the couch.

4. A system as described in claim 3 wherein the headrest includes a support disposed between and connected to the head support and backing, with the shielding contacting the support.

5. A system as described in claim 4 wherein the shielding has a base that contacts the support, a first prong that extends from the base at a first side of the support and a second prong that extends from the base at a second side of the support.

6. A system as described in claim 5 wherein the shielding is disposed in perpendicular relationship with the backing and the head support.

7. A system as described in claim 6 wherein the head support and the backing are in spaced relationship and in alignment with each other but offset from each other.

8. A system as described in claim 7 wherein the support has ribbing that extends to the backing.

9. A system as described in claim 8 wherein the first prong and second prong and backing form a U-shape that is adapted to close a scanner opening except for a gap disposed between the first prong and the second prong through which the head of a patient can extend and rest on the head support in the scanner.

10. A system as described in claim 9 wherein the support has a top surface which is contoured for the neck of the patient to rest against.

11. A system as described in claim 10 wherein the support is contoured to fit with the couch.

12. A system as described in claim 11 wherein the support has loop and hook fasteners to connect to the couch.

13. A system as described in claim 12 wherein the shield includes a layer of lead.

14. A method for scanning the head of a patient with a scanner comprising the steps of:

connecting a headrest with a shield to shield the scanner from the patient's body beyond the head from radiation to a couch;

moving the couch with the headrest into an opening of the scanner so the shielding blocks the opening;

scanning the patient's head with the scanner;

moving the couch away from the scanner; and removing the headrest from the couch.

15. A method as described in claim 14 wherein the moving step includes the step of moving a head support of the headrest into the scanner.

16. A method as described in claim 15 wherein the connecting step includes the step of connecting a backing of the headrest to the couch.

17. A method as described in claim 16 wherein the connecting step includes the steps of placing a gap of the shielding through the head support and attaching a base of the shielding to a support of the headrest that connects to and is disposed between the head support and the backing.

18. A headrest for a couch of a scanner for a patient who is having the patient's head scanned comprising:

a head support;

a support from which the head support extends;

shielding connected to the support to shield the scanner from radiation emitted from the patient's body beyond the head; and a backing extending from the support, the head support, the support, the shielding and the backing together being removable from the couch.

19. A headrest as described in claim 18 wherein the head support and the backing are in spaced relationship and in alignment with each other but offset from each other.

20. A headrest as described in claim 19 wherein the first prong and second prong and backing form a U-shape that is adapted to close a scanner opening except for a gap disposed between the first prong and the second prong through which the head of a patient can extend and rest on the head support in the scanner.

* * * * *